Patented Oct. 18, 1927.

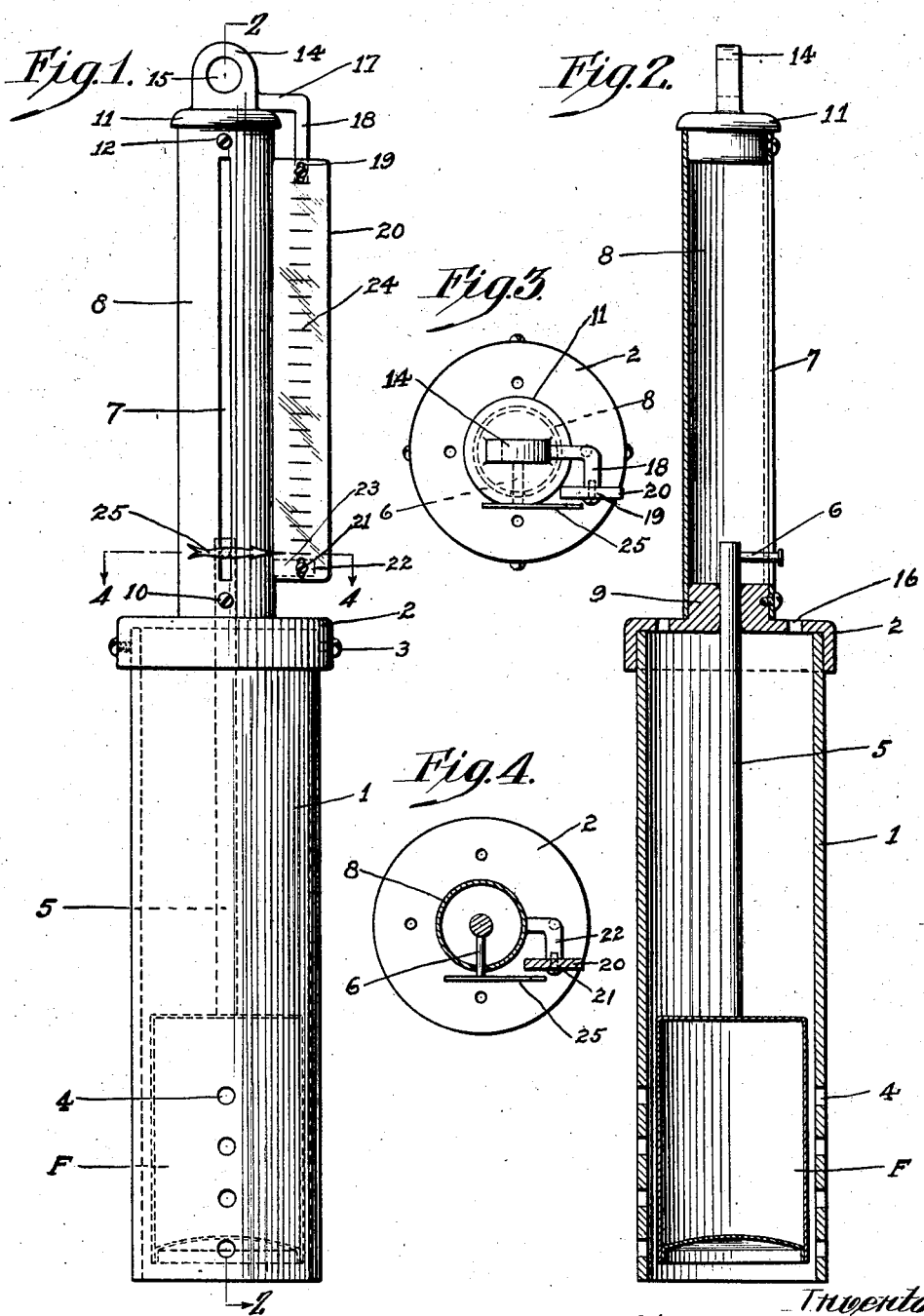

1,646,317

UNITED STATES PATENT OFFICE.

EDWARD A. REIN, OF SEASIDE HEIGHTS, NEW JERSEY, ASSIGNOR OF ONE-THIRD TO HOWARD W. IRWIN AND ONE-THIRD TO ANTHONY F. LEIDY, BOTH OF SEASIDE HEIGHTS, NEW JERSEY.

LIQUID GAUGE.

Application filed August 19, 1926. Serial No. 130,289.

This invention relates to certain improvements in liquid gauges and it is an object of the invention to provide a device of this kind particularly adapted for use in connection with gasoline storage tanks of the standard type used at gasoline stations, said gauge being so constructed and operated to permit the stationman to readily determine the amount of gasoline within the tank.

It is now the general custom to gauge the amount of gasoline within a storage tank through the medium of a measuring stick which, in many instances, is inaccurate and thus the stationman cannot be assured of the amount of gasoline within a tank, or particularly to determine the amount of gasoline delivered from the tank wagon, or to determine the losses by evaporation or otherwise as may occur.

The invention consists in the details of construction and in the combination and arrangement of the several parts of my improved liquid gauge whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in elevation of a gauge constructed in accordance with an embodiment of my invention;

Figure 2 is a sectional view taken substantially on the line 2—2 of Figure 1 with certain of the parts in elevation;

Figure 3 is a view in top plan of the structure as illustrated in Figure 1;

Figure 4 is a sectional view taken substantially on the line 4—4 of Figure 1.

My improved gauge, as herein disclosed, comprises an elongated tubular member 1 having its lower end open and its upper end closed by a slip cap 2, said cap being preferably held in applied position by the diametrically opposed screws 3. The lower or open end portion of the member 1 is provided in its wall with the inlet perforations or openings 4 to facilitate the rise of the float F within the member 1 when the gauge is in use.

The float F, as herein disclosed, is of a hollow type although it is to be understood that it may be constructed in any manner which best complies with the requirements of practice.

Extending upwardly from the axial center of the float F is a rod 5 which is slidably disposed through the axial center of the cap 2, said rod 5 outwardly or above the cap 2 being provided with a laterally directed pin or finger 6. This pin or finger 6 is freely disposed through a slot 7 extending lengthwise of a sleeve 8. One end of the sleeve 8 has slip connection with an outstanding central boss 9 carried by the cap 2 and held or locked thereto by the screw 10. The opposite or outer end of the sleeve 8 is closed by the plug cap 11 held in applied position by the screw 12. This plug cap 11, as herein disclosed, is provided with an outstanding ear or lug 14 having disposed therethrough an opening 15 whereby the gauge, when not in use, may be readily and conveniently suspended from a wall or the like.

The cap 2 is provided with a series of perforations or openings 16 communicating within the tubular member 1 whereby the functioning of the float F is materially facilitated to assure accuracy of indication.

Extending outwardly from the ear or lug 14 is an arm 17 terminating in a depending extension 18 adjustably connected, as at 19, with an indicating plate 20. This plate 20 extends lengthwise of the sleeve 8 and has its inner or lower end portion adjustably connected, as at 21, to the free end of a horizontally disposed extension 22 carried by an arm 23 arranged at the lower or inner portion of the sleeve 8.

The extensions 18 and 22 are so arranged as to position the indicating plate 20 in quartered relation with respect to the slot 7 and said plate is provided therealong with a series of graduations 24 to denote gallons. The outer end of the pin or finger 6, hereinbefore referred to, is provided with a cross member 25 constituting a pointer or index for coaction with the graduations 24 so that the amount of gasoline within a supply tank may be readily determined by the liquid level within such supply tank.

In practice, my improved gauge, or more particularly the tubular member 1, is inserted within a supply tank through the conventional filling opening or pipe with the inserted end of the member 1 resting on the bottom of the tank. The float F within the member 1 will then rise according to the liquid level within the tank, bringing the index or pointer 25 in such position with respect to the graduations 24 on the plate 20 to readily indicate the amount of gasoline within the tank. As the supply tank will have a capacity of a known quantity, the desired reading may be readily and conveniently obtained.

My improved gauge is of especial importance for use by those in charge of a gasoline station as after a supply tank has been filled from a tank wagon or the like, the quantity of gasoline delivered may be readily and accurately computed as can also the loss by evaporation or otherwise. In addition, it will be understood that with the use of my improved gauge, it is possible to determine at any time just how much gasoline is within the supply tank.

By having the plate 20 adjustably connected, as at 19 and 21, provision is made for assuring an accurate adjustment of the plate 20 or more particularly the graduations 24 thereon with respect to the pointer or index 25 and thereby overcoming such variations as may be occasioned by the differences in buoyancy of floats.

From the foregoing description it is thought to be obvious that a liquid gauge constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A gauge comprising a tubular member, a slip cap applied to the end thereof, means for fixing the slip cap, a rod slidably mounted in the slip cap, a float carried by the rod and housed in the tubular member, a sleeve mounted upon said cap and provided at its side with a vertically disposed slot, a finger carried by the rod and extending through said slot, said sleeve being provided at its side with an extension arm disposed at a right angle to the medium vertical plane of the slot, a plug cap inserted in the sleeve, means for fixing the plug cap with relation to the sleeve, an arm extension carried by the plug cap, a plate carried by the arm extensions and a pointer carried by the finger and disposed transversely of the plate.

In testimony whereof I hereunto affix my signature.

EDWARD A. REIN.